United States Patent [19]

Toyosawa et al.

[11] Patent Number: 4,906,538
[45] Date of Patent: Mar. 6, 1990

[54] NON-AQUEOUS SECONDARY CELL

[75] Inventors: Shinichi Toyosawa; Shigeru Kijima, both of Tokorozawa; Hideharu Daifuku, Kodaira; Yuko Maeda, Akishima; Katsuhiko Arai, Iruma; Takahiro Kawagoe, Tokorozawa, all of Japan

[73] Assignee: Bridgestone Corporation, Tokyo, Japan

[21] Appl. No.: 169,881

[22] Filed: Mar. 18, 1988

[30] Foreign Application Priority Data

Mar. 18, 1987 [JP] Japan .................................. 62-64995
Apr. 16, 1987 [JP] Japan .................................. 62-93962
May 21, 1987 [JP] Japan .................................. 62-124921
May 21, 1987 [JP] Japan .................................. 62-124922

[51] Int. Cl.[4] ............................................ H01M 4/60
[52] U.S. Cl. ..................................... 429/197; 429/213
[58] Field of Search ....................... 429/194, 197, 213

[56] References Cited

U.S. PATENT DOCUMENTS

4,717,634  1/1988  Daifuku et al. ..................... 429/213
4,740,436  4/1988  Kobayashi et al. ................. 429/213

Primary Examiner—Donald L. Walton
Attorney, Agent, or Firm—Oblon, Spivak, McClelland, Maier & Neustadt

[57] ABSTRACT

A non-aqueous secondary cell comprising a positive electrode, a negative electrode and a non-aqueous electrolyte is provided wherein the positive electrode comprises as an active material polyaniline containing 15 to 30% by weight of $BF_4$.

10 Claims, 5 Drawing Sheets

NON-AQUEOUS SECONDARY CELL

BACKGROUND OF THE INVENTION

1. Field of the Invention

This invention relates to a non-aqueous secondary cell comprising a positive electrode, a negative electrode and a non-aqueous electrolyte solution.

2. Discussion of the Background

Electroconductive polymers such as polyaniline, polypyrrole, and polyacetylene are of great interest as electrode material. A variety of secondary cells have been proposed using these electroconductive polymers. In particular, research effort has been focused on secondary cells using polyaniline as electrode active material because a remarkably high energy density is expectable. However, secondary cells using electroconductive polymers as their positive electrode active material suffer from the phenomena that their self-discharge property is poor and their cycle life property is insufficient. Further improvements are necessary for these secondary cells perform commercially satisfactorily.

This is also true for secondary cells using polyaniline. In order to solve the above problems, various proposals have been made so that polyaniline is effectively used as positive active material for a secondary cell. For instance, various methods or conditions for preparing a polyaniline have been proposed by which the polyaniline may show good properties for positive electrode active material.

However, there are needs for a secondary cell using polyaniline which has better self-discharged and cycle life properties.

SUMMARY OF THE INVENTION

An object of the present invention is to provide a non-aqueous secondary cell using polyaniline electrodes.

Another object of the present invention is to provide a non-aqueous secondary cell which exhibits improved performance including a low self-discharge, a long cycle life, and an increased discharge capacity.

A further object of the present invention is to provide a non-aqueous secondary cell which is more commercially acceptable.

According to the present invention, there is provided a non-aqueous secondary cell comprising a positive electrode, a negative electrode, and a non-aqueous electrolyte solution, wherein the positive electrode comprises an active material in the form of polyaniline containing 15 to 30% by weight of $BF_4$.

BRIEF DESCRIPTION OF THE DRAWINGS

These and other objects, features, and advantages of the present invention will be better understood from the following description taken in conjunction with the accompanying drawings, in which.

DETAILED DESCRIPTION OF THE INVENTION

We have discovered that when polyaniline having specific physical properties, that is, having a $BF_4$ content controlled to range from about 15 to about 30% by weight is used as a positive electrode active material, unexpectedly there is obtained a high performance secondary cell having a less self-discharge, a long cycle life and a high capacity.

Although various forms of polyaniline have been proposed as the positive electrode active material for secondary cells, little attention has been paid to the composition or impurity content of a positive electrode-forming polyaniline film itself. The only proposal is to control the water content of a polyaniline film (see U.S. Pat. No. 4,717,634). We have discovered that polyaniline containing $BF_4$ is desired for use as the positive electrode active material for secondary cells. Particularly a secondary cell using polyaniline which contains $BF_4$ in a specific amount of from about 15 to about 30% by weight, shows the excellent self-discharge and cycle life properties. In other words, the cycle properties of a secondary cell can be significantly improved by using polyaniline containing about 15 to about 30% by weight of $BF_4$ as positive electrode active material.

The present invention is directed to a secondary cell comprising a positive electrode, a negative electrode, and a non-aqueous electrolyte solution. The positive electrode includes an active material comprising polyaniline. According to the present invention, the polyaniline contains 15 to 30% by weight, preferably 17 to 25% by weight of $BF_4$ therein. Using such a specific polyaniline as the positive electrode active material, there is obtained a secondary cell having a low self-discharge and a long cycle life. With polyaniline having $BF_4$ contents of less than about 15% by weight or more than about 30% by weight, the discharge capacity and capacity retentivity of the cell are low.

The polyaniline contains $BF_4$ in the form of an ion, a molecule or a mixture thereof as well as an acid ($HBF_4$) or salt ($LiBF_4$ or the like) or a mixture thereof.

The method for preparing polyaniline so as to control its $BF_4$ content is not particularly limited. Preferred are an electrolytic polymerization method for electrode-positing polyaniline from an aqueous acidic solution containing aniline and a chemical polymerization method for preparing polyaniline through chemical oxidative polymerization in an aqueous acidic solution containing aniline and a catalyst.

The electrolytic polymerization method will be described in detail.

The acid in the aqueous acidic solution used herein is not particularly limited although HCl, $H_2SO_4$, $HBF_4$, $HClO_4$ and a mixture thereof are preferably used. The most preferred acid is $HBF_4$. The concentration of acid is preferably set to 0.1 to 3 mol/liter, more preferably 0.5 to 2.5 mol/liter. Aniline is preferably present in the aqueous acidic solution in a concentration of 0.05 to 4 mol/liter, more preferably 0.25 to 1.5 mol/liter. The aqueous acidic solution may optionally contain another additive such as a soluble salt for pH adjustment in addition to the acid and aniline ingredients.

Working and counter electrodes are immersed in the above-mentioned aqueous acidic solution to prepare polyaniline through electrolytic polymerization. The electrodes used are not particularly limited. The working electrode may be formed of platinum, stainless steel, carbon and $PbO_2$ and have any desired shape including plate, foil, mesh and punched metal form. Mesh stainless steel is most preferred as the working electrode. The counter electrode may also be formed of platinum, stainless steel, carbon and $PbO_2$ and have any desired shape including plate, foil, mesh and punched metal form. A stainless steel plate in punched metal form is most preferred as the counter electrode.

Electrolytic polymerization may be carried out in either a potential or current controlled mode. The current controlled mode of electrolytic polymerization may include a constant current control mode wherein a fixed value of current is continuously applied, a step current control mode wherein the value of current is changed in predetermined time intervals, a continuous current control mode wherein current is increased or decreased with time, and a cyclic current control mode wherein the value of current is changed cyclically. Electrolytic polymerization may be carried out under any desired conditions, often under conventional conditions while the polymerization solution is kept at a temperature of from $-10°$ C. to $15°$ C., preferably from $-5°$ C. to $9°$ C.

Preparation of polyaniline is described in copending U.S. Ser. No. 863,527 assigned to the same assignee as the present invention.

Polyaniline is synthesized by adding the above-mentioned polymerization solution in an electrolytic tank, immersing the above-mentioned working and counter electrodes in the solution, and carrying out electrolytic polymerization. In one preferred embodiment, the counter electrode is comprised of a plurality of spaced-apart segments and the current or voltage applied to the respective segments is independently controlled, then the current distribution between the working and counter electrodes can be controlled. This controls the rate of polymerization electrode and deposition of polyaniline on the surface of the polymerization electrode which governs the thickness distribution of polyaniline film. Consequently, the thickness distribution of polyaniline film may be properly controlled to improve film formability.

When aniline is electrolytically polymerized by this method, no particular limit is imposed on the shape, size, arrangement, and number of segments constituting the counter electrode. For example, a suitable number of segments of the same shape and size may be arranged to constitute the counter electrode. A suitable number of segments of different shapes and sizes may be arranged to constitute the counter electrode in which the ratio in surface area between different segments is suitably chose. It is preferred to divide the counter electrode into 10 or more segment per meter of the polymerization electrode in a longitudinal direction. The segments are then juxtaposed with a mutual spacing of not more than about 5 cm. A shielding partition is preferably disposed between two adjoining segments. The structure of segments is not particularly limited and any desired structure may be used including plate, mesh and bar shapes.

Figure 1:
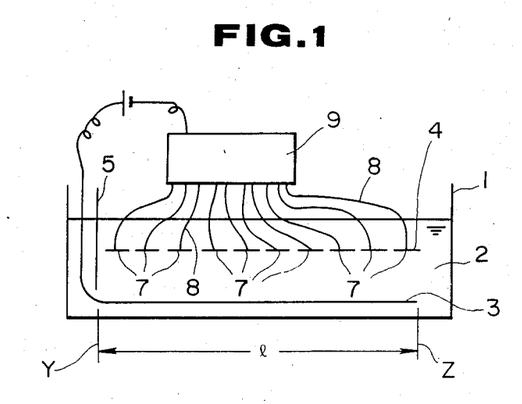
FIGS. 1 through 4 schematically illustrate different examples of polymerization apparatus for preparing polyaniline for use in a secondary cell according to the present invention.
Figure 2:
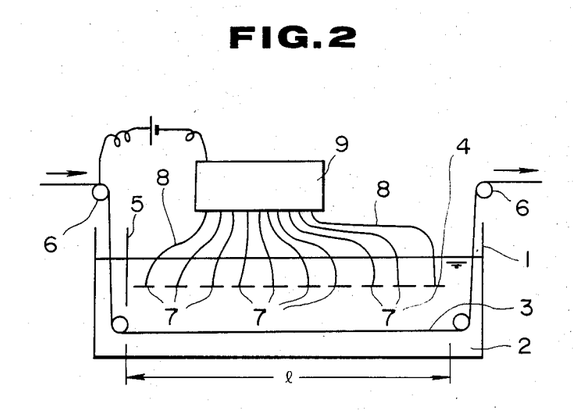

Referring to the drawings, either a batchwise apparatus as shown in FIG. 1 or a continuous apparatus as shown in FIG. 2 may be suitably used for electrolytic polymerization. In FIGS. 1 and 2, the polymerization apparatus includes a tank 1 filled with electrolytic solution 2, a working electrode 3, a counter electrode 4 and a power supply. The counter electrode 4 is formed by juxtaposing a plurality of (10 in the figures) rectangular planar segments 7 on a horizontal plane with a suitable spacing therebetween. The segments 7 are individually connected to a current/voltage control unit 9 through conductor lines 8 so that the current or voltage to each segment 7 may be independently controlled.

Figure 3:
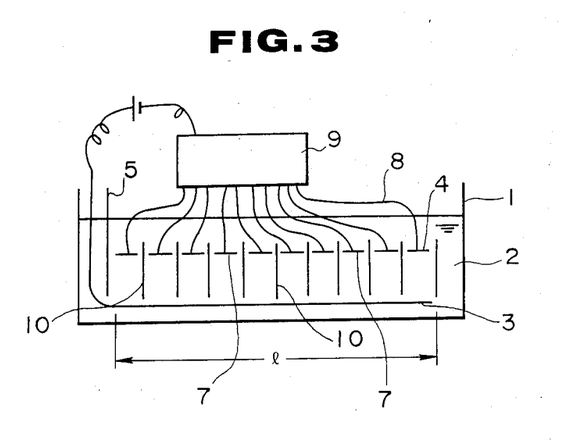

FIGS. 3 and 4 show other examples of the apparatus used in the practice of electrolytic polymerization. The apparatus shown in FIG. 3 is similar to that shown in FIG. 1 except that a corresponding plurality of shielding partitions 10 are vertically disposed in the tank so that each partition 10 is located between two adjoining segments 7. The partitions 10 are formed of plastics material such as polypropylene, polyvinyl chloride, polytetrafluoroethylene, acrylic resin and the like. This arrangement enables more precise control of current distribution. The partitions 10 are usually kept out of contact with the segments 7. The partitions 10 may be placed in contact with the segments 7 if the partitions are non-conductive.

Figure 4:
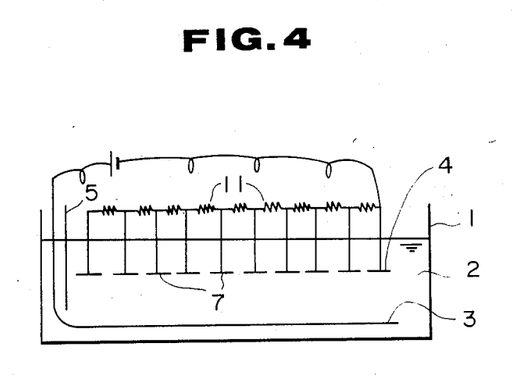

The apparatus shown in FIG. 4 is also similar to that shown in FIG. 1 except that instead of the current/voltage control unit 9, the segments 7 are sequentially connected via resistors 11 of a predetermined resistance so that individually controlled current or voltage may be applied to each segment 7 when electricity is supplied to the counter electrode 4. The resistors 11 may be immersed in the solution.

Polyaniline film may be prepared by using any of the illustrated apparatus. It is possible to obtain a polyaniline film with uniform thickness distribution by controlling the current distribution from the polymerization electrode 3 to the counter electrode 4 uniform by virtue of the current/voltage control unit 9 (FIGS. 1-3) or the series of resistors 11 (FIG. 4). Alternatively, a polyaniline film having varying thickness distribution can be formed by suitably changing the current distribution. An increased productivity is expectable in the case of continuous polymerization.

When polyaniline is prepared by chemical polymerization, an aqueous acidic solution having a catalyst added thereto is used as described above. The solution used herein may be the same as previously described for electrolytic polymerization. Any desired catalyst may be added as long as it promotes the reaction. For example, $Na_2S_2O_8$, $(NH_4)_2S_2O_8$, and $FeCl_3$ may be added. Chemical polymerization may be carried out in a conventional manner while the solution is preferably kept at a temperature of at least $30°$ C.

The polyaniline prepared by the electrolytic or chemical polymerization method as described above most often contains a variety of impurities including residual monomer, by-products and decomposed products formed during polymerization. If the polyaniline as polymerized is used as electrode material in a cell without removing impurities, the impurities would dissolve away into the electrolyte solution or react with the electrolyte, detracting from cell performance. It is thus preferred to remove impurities before the polyaniline is assembled in a cell as electrode material.

Impurities may be removed from the polyaniline by conventional well-known methods, for example, by immersing the polyaniline film containing impurities in water or an organic solvent suitable for removal of the impurities for a predetermined time, with optional mechanical stirring, to thereby extract away the impurities. This extracting step is carried out at least once, and repeated if desired. In the practice of the present invention, however, removal of impurities is preferably carried out by continuously passing water or an organic solvent across a polyaniline film in a transverse or thickness direction.

Purification of as-polymerized polyaniline will be described in more detail. Polyaniline film has a fibrillar structure in which polyaniline fibrils are randomly tangled. Conventional purifying method as described above fails to fully remove impurities from a polyaniline film having such a fibrillar structure because water or organic solvent cannot fully penetrate throughout the polyaniline film. In addition, since the amount of impurities which are extracted in a single step is limited due to dissolution equilibrium, impurities cannot be fully removed in an efficient manner. The purifying operation must be repeated in order to increase the degree of purification, increasing the time and labor to raise the cost. In contrast, impurities can be efficiently removed from a polyaniline film by continuously passing water or organic solvent across the polyaniline film in a transverse direction because fresh water or organic solvent which has not extracted impurities continuously passes through the film for washing and the amount of impurities extracted is not limited by dissolution equilibrium. Even when the polyaniline film has a fibrillar structure, application of pressure can cause water or organic solvent to fully penetrate throughout the film. Then impurities can be efficiently removed with a relatively small volume of wash liquid within a short period of time, resulting in a polyaniline film having a reduced content of impurities.

The type of water used in this preferred purifying method is not particularly limited although deionized water or distilled water is used if desired. No particular limit is imposed on the temperature of wash water as long as the temperature is above the freezing point and below the boiling point. If desired, aqueous alkaline solutions having NaOH and NH4OH dissolved therein or aqueous acidic solutions having HCl and HBF4 dissolved therein may be used for washing. Further, solutions of LiBF4 and LiOH may also be used.

Also, the type of the organic solvent used in washing is not particularly limited. Any organic solvent suitable for particular impurities may be used, for example, acetonitrile, methanol, and ethanol. Organic solvents having dissolved therein salts such as LiBF4 and LiClO4 may also be used. If desired, a mixture of two or more organic solvents or a mixture of an organic solvent and water may be used.

This preferred method of removing impurities by continuously passing was liquid, i.e., water or organic solvent through a polyaniline film in a transverse direction may be practiced in various ways. For example, wash liquid is added dropwise onto the polyaniline film which is held horizontally so that the wash liquid may pass through the film under gravity. However, since the polyaniline film has a fibrillar structure in which conductive polyaniline fibrils are densely overlapped and tangled, the film has such a high resistance to filtration that no efficient washing is often expected simply under the action of gravity. Therefore, the washing operation is preferably carried out under super- or sub-atmospheric pressure to achieve efficient removal of impurities.

Also, no limitation is imposed on the amount, flow rate, and number of passes of wash liquid. For example, a polyaniline film which is deposited on stainless steel mesh by electrolytic polymerization in a weight of about 30 mg/cm$^2$ may be washed with about 1.0 to about 30 ml/cm$^2$ of deionized water at about 25° C. at a flow rate of about 0.1 to about 10 ml/cm$^2$-min.

The amount of the wash liquid per thickness of polyaniline film may vary depending on the film thickness, althouh 1 to 20 ml/cm$^2$ (film area) per 1 mm thickness of the polyaniline film is preferred.

The water or organic solvent used in purifying a polyaniline film may be covered, removed of the extracted impurities, and then reused for washing.

Figure 5:
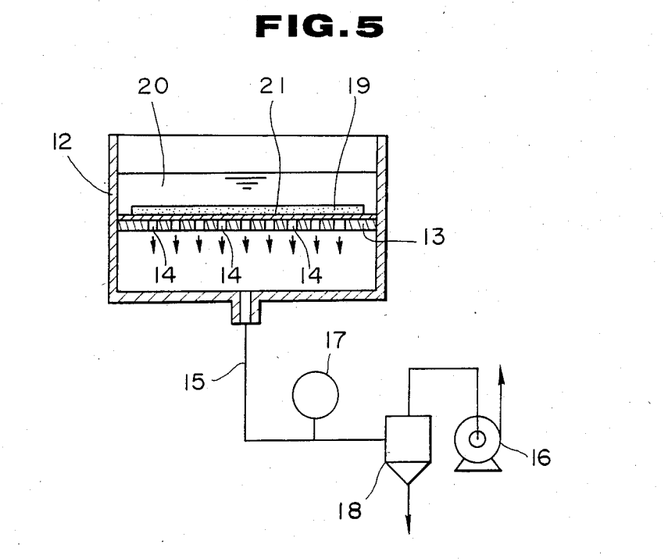
FIG. 5 schematically illustrates an apparatus for washing polyaniline for use in a secondary cell according to the present invention.
Figure 6:
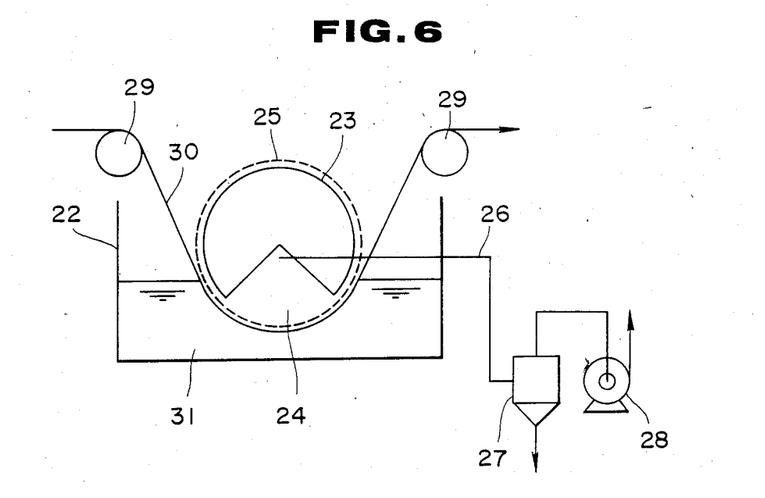
FIG. 6 schematically illustrates another apparatus for washing polyaniline for use in a secondary cell according to the present invention.

The preferred washing method described above may be carried out in an apparatus as shown in FIGS. 5 and 6, for example.

The washing apparatus shown in FIG. 5 includes a tank 12 defining a passage for wash liquid and a horizontal plate 13 extended to traverse the passage for supporting a polyaniline film 19 thereon. The plate 13 is provided with a plurality of perforations 14. An outlet in the bottom of the wash tank 12 is connected to a discharge line 15 which is, in turn, connected to a vacuum pump 16 via a vacuum meter 17 and a sump 18 for receiving used liquid.

Crude polyaniline film is washed by means of this apparatus by first placing the polyaniline film 19 on top of the perforated plate 13 so as to cover the perforations 14. Wash liquid (water or organic solvent) 20 is poured into the tank 12 from above. Then the wash liquid is continuously percolated through the film under the action of gravity so that the wash liquid may take impurities away from the film. In this operation, it is preferred that a fluid-permeable support 21 in the form of a porous plastic film or filter paper rest on the plate 13 and the film 19 rest on the support 21 as shown in FIG. 5. Then the wash liquid 20 is uniformly distributed over the film 19 to ensure uniform washing or removal of impurities. If necessary, the vacuum pump 16 is actuated to vacuum the space of the tank 12 below the plate 13 to promote passage of the wash liquid across the film.

The washing apparatus shown in FIG. 6 includes a tank 22 and a generally cylindrical drum 23 fixedly mounted in the tank. The tank 22 is filled with wash liquid 31 (water or organic solvent) such that a lower portion of the drum 23 is immersed in the liquid. The drum 23 is provided at the bottom with a suction recess or chamber 24 having a sector cross section. Around the drum 23 is rotatably mounted a cylindrical holder 25 capable of passage of wash liquid therethrough. A drain line 26 has one end connected to the suction chamber 24 and another end connected to a vacuum pump 28 through a sump 27 for receiving wash liquid. The apparatus further includes inlet and outlet guide rollers 29 so that a polyaniline film 30 is trained around the inlet guide roller 29, a bottom portion of the holder 25 surrounding the drum 23, and the outlet guide roller 29 and moved in this order.

Crude polyaniline film is washed by means of this apparatus by first actuating the vacuum pump 28 to keep the suction chamber 24 at a reduced pressure. The holder 25 is rotated to continuously move the film in an arrowed direction. Then, the wash liquid 31 passes through the film 30 and the holder 25 into the suction chamber 24 and then the drain line 26. On passing through the film, the wash liquid entrains impurities away from the film.

It is thus evident that the apparatus of FIGS. 5 and 6 are effective in washing a polyaniline film with fresh wash liquid which has not extracted impurities. The apparatus of FIG. 6 permits continuous washing. It is to be understood that the used wash liquid may be continuously recovered, removed of the extracted impurities, and then passed to the apparatus for reuse.

As previously described, the $BF_4$ content of the resulting polyaniline is controlled to the range of from 15 to 30% by weight according to the present invention. Control of $BF_4$ content may be carried out in any desired manner. Any desired control method may be chosen depending on the $BF_4$ content of polyaniline prior to control. When the polyaniline is prepared from an aqueous acidic solution containing $HBF_4$, the product contains an excess of $BF_4$. Then it is generally recommended to wash the polyaniline with deionized water. When a polyaniline is prepared from an aqueous acidic solution containing an acid other than $HBF_4$ or when $BF_4$ is completely removed along with other impurities by purification, the polyaniline is free of $BF_4$. Then it is generally recommended to immerse or wash the polyaniline in an amount less than the above-defined range, it is immersed in or washed with a solution containing $BF_4$.

When the polyaniline is treated by washing or immersion, short- or over-washing or immersion should be avoided. To this end, a liquid whose type, nature, and amount are properly chosen should be used and washing or immersing operation should be carried out by proper means under properly controlled conditions. For the treatment of a polyaniline containing an excess amount of $BF_4$, it is washed with deionized water such that the $BF_4$ content of the polyaniline is reduced to the above-defined range. For the treatment of a polyaniline free of $BF_4$ or containing a less amount of $BF_4$, it is washed with or immersed in a $BF_4$ solution as described above. The $BF_4$ solution used herein may be prepared by dissolving 0.001 to 2 mol/liter, preferably 0.01 to 1 mol/liter of a borofluoric acid or salt such as $HBF_4$ or $LiBF_4$ in deionized water or a suitable organic solvent.

This washing or immersion for $BF_4$ content control may be carried out by the same method as previously described for the purification process. It is also possible to carry out washing or immersion for the both purposes of purification and $BF_4$ content control.

The secondary cell of the present invention uses polyaniline containing 15 to 30% by weight of $BF_4$ as a positive electrode active material. Although not necessary required, the polyaniline is preferably further controlled such that when one gram of polyaniline is extracted with 200 ml of water, the extract water has an equilibrium pH in the range of from 2.4 to 4, especially from 2.7 to 3.5. With this control, the objects of the present invention are more effectively achieved.

It is generally preferred that the polyaniline used as the positive electrode active material for a secondary cell is removed of impurities, including residual monomer, by-products and decomposed products resulting from polymerization, which would otherwise detract from the performance of the cell. Unexpectedly, we have discovered that a polyaniline which contains a certain amount of ionic material is effective in improving the cell performance, particularly self-discharge and cycle life, as compared with a polyaniline which is completely free of impurities. More particularly, the cycle properties of a secondary cell are remarkably improved by using as its positive electrode active material a polyaniline which contains such an amount and type of ionic material that when 1 gram of polyaniline is extracted with 200 ml of water, the extract water has an equilibrium pH in the range of from 2.4 to 4. Those polyanilines which exhibit an extract water equilibrium pH of less than 2.4 or more than 4 will sometimes provide cells having a low discharge capacity or capacity retentivity.

Measurement of the equilibrium pH of the extract water will be described in more detail. The water used is deionized water at a temperature of 25° C. Extraction is carried out by immersing the polyaniline in deionized water with or without agitation. The equilibrium pH of the extract water is a pH value recorded when the pH of the deionized water reaches equilibrium. The polyaniline is immersed in deionized water for a time until the water reaches equilibrium. This immersion time is usually about 48 hours.

The equilibrium pH of extract water from polyaniline may be controlled to the range of from 2.4 to 4 by any desired method. A suitable control method may be chosen depending on the extract water equilibrium pH that the polyaniline possesses prior to the control. Since those polyanilines which are prepared from aqueous acidic solutions by electrolytic or chemical polymerization most often exhibit an extract water equilibrium pH of lower than 2.4, it is recommended to wash the polyanilines with deionized water. Short- or over-washing should be avoided. To this end, a liquid whose type, nature and amount are properly chosen should be used and washing operation should be carried out by a proper means under properly controlled conditions. Preferably, deionized water is used in an amount of 10 to 900 ml, preferably 20 to 600 ml per gram of a polyaniline film having a thickness of 3 to 4 mm and a weight of 5 to 100 $mg/cm^2$. The polyaniline film is then washed by passing water through the film in a transverse direction at a temperature of 5° to 20° C.

In the secondary cell of the present invention having the above-defined polyaniline as its positive electrode active material, the negative electrode active material may be properly selected from various materials which are used as the negative electrode active material in the prior art. The preferred negative electrode active material is a lithium alloy. A lithium secondary cell which has improved performance and is commercially fully acceptable is available from a combination of the polyaniline as defined in the present invention with a lithium alloy.

The lithium alloy used herein include those alloys prepared by heat melting a mixture of lithium and at least one member selected from metals capable of alloying with lithium, for example, aluminum, silver, lead, tin, bismuth, antimony, indium, cadmium and alloys thereof in vacuum or an inert gas atmosphere, homogeneously mixing, cooling and solidifying into an alloy ingot, as well as those alloys prepared by electrochemically introducing lithium into such a metal as described above. No particular limit is imposed on the composition of lithium alloy are Li-Al alloy, and Li-Al-Bi alloy. Particularly, a lithium-aluminum alloy containing 25 to 65 atom% of lithium is most effective in stabilizing the cycle performance to extend the cell life.

The electrolyte of the non-aqueous electrolyte liquid which constitutes the secondary cell of the present invention is a compound having an anion combined with a cation. Some illustrative, non-limiting examples of the anion include anions of Group Va element halides such as $PF_6^-$, $SbF_6^-$, $AsF_6^-$, and $SbCl_6^-$, anions of Group IIIa element halides such as $BF_4^-$ and $AlCl_4^-$, halide anions such as $I^-$ ($I_3^-$), $Br^-$, and $Cl^-$, perchlorate anions such as $ClO_4^-$, and $HF_2^-$, $CF_3SO_3^-$, $SCN^-$, $SO_4^{--}$, $HSO_4^-$, etc. Some illustrative, nonlimiting examples of the cation include alkali metal ions such as $Li^+$, $Na^+$ and $K^+$. Illustrative examples of compounds having such anions and cations include $LiPF_6$, $LiSbF_6$, $LiAsF_6$, $LiClO_4$, $LiI$, $LiBr$, $LiCl$, $NaPF_6$, $NaSbF_6$, $NaAsF_6$, $NaClO_4$, $NaI$, $KPF_6$, $KSbF_6$, $KAsF_6$, $KClO_4$, $LiBF_4$, $LiAlCl_4$, $LiHF_2$, $LiSCN$, $KSCN$, and $LiSO_3CF_3$. Lithium salts, particularly $LiClO_4$, $LiBF_4$, $LiPF_6$, and $LiAsF_6$ are preferred among others for obtaining a light weight, stabilized secondary cell.

The electrolytes are generally used as solutions thereof dissolved in solvents. The type of solvent is not particularly limited although preferred are relatively highly polar solvents. Examples of the solvents include ethylene carbonate, propylene carbonate, benzonitrile, acetonitrile, tetrahydrofuran, 2-methyltetrahydrofuran, $\gamma$-butyrolactone, dioxolane, methylene chloride, triethyl phosphate, triethyl phosphite, dimethyl sulfate, dimethylformamide, dimethylacetamide, dimethylsulfoxide, dioxane, dimethoxyethane, polyethylene glycol, sulfolane, dichloroethane, chlorobenzen, and nitrobenzene alone or mixture of two or more of them. Preferred among these are ethylene carbonate, propylene carbonate, dimethoxyethane, tetrahydrofuran and $\gamma$-butyrolactone alone or a mixture of two or more of these solvents. Most preferred is a mixture of propylene carbonate and dimethoxyethane in a volume ratio of from 35:65 to 65:35. In the practice of the present invention, the preferred electrolyte liquid promising the best cell performance is a mixture of 35 to 65% by volume of propylene carbonate and the remainder of dimethoxyethane having from more than 1 mol/liter to 3 mol/liter of $LiBF_4$ dissolved therein.

The cells of the present invention are generally manufactured as coin, box, or cylinder shaped batteries. The cells are usually constructed by placing the positive and negative electrodes in an outer casing while interposing the electrolyte liquid between the electrodes. If desired, a porous film formed of a synthetic resin such as polyethylene and polypropylene or natural fibers may be disposed between the positive and negative electrodes as a separator.

As described above, the non-aqueous secondary cells of the present invention which uses a polyaniline having a $BF_4$ content controlled to the range of from 15 to 30% by weight as a positive electrode active material have the advantages of minimized self-discharge, extended cycle life, and increased discharge capacity. They will find applications in various fields including automobiles, aircrafts, portable equipment, and electric automobiles.

EXAMPLES

Examples of the present invention are given below by way of illustration and not by way of limitation.

EXAMPLE 1

A working electrode of stainless steel mesh was horizontally disposed in an aqueous acidic solution containing 1 mol/liter of aniline and 2 mol/liter of $HBF_4$. The counter electrode used was stainless steel of punched metal form. With the solution kept at a temperature of 3° C., a polyaniline was electrodeposited on the working electrode by applying electricity across the electrodes in a quantity of 60 Coulomb per square centimeter ($C/cm^2$) to carry out electrolytic polymerization.

The resulting polyaniline film was taken out together with the stainless steel mesh. The film was washed by passing deionized water through the film to extract away an excess of $BF_4$. The amount of deionized water passed corresponds to about 12 $ml/cm^2$ polyaniline film.

The polyaniline film was dried in vacuum for 72 hours. The thickness of the film was 1.3 mm and the weight of polyaniline deposited was ca. 32 $mg/cm^2$. A portion weighing 50 mg was cut out of the film and immersed in 50 ml of water containing 0.2 mol/liter of hydrazine for 48 hours to completely extract $BF_4$ from the polyaniline. The extract liquid was adjusted to pH 7 with dilute sulfuric acid before the concentration of $BF_4$ was measured by the $BF_4$ ion electrode process. Based on the measurement, the amount of $BF_4$ contained in the polyaniline film was calculated to be 23% by weight.

A coin-type secondary cell was constructed by cutting a disk of 15 mm in diameter from the polyaniline film along with the stainless steel mesh, which was used as a positive electrode. The negative electrode used was a lithium-aluminum alloy containing 50 atom% of lithium. The electrolyte solution was a mixture of propylene carbonate and dimethoxyethane in a volume ratio of 50:50 containing 3 mol/liter of $LiBF_4$. A laminate of a non-woven polypropylene fabric and a porous polypropylene film was disposed between the electrodes as a separator.

The cell was charged up to 3.3 volts (V) with a constant current of 0.5 miliampere (mA) and further charged for 3 hours at a constant voltage of 3.3 V. Immediately after charging, the cell was discharged up to 2.0 V at 0.5 mA to find a discharge capacity of 4.9 mAh.

A similarly charged cell was kept for one week at 60° C. and then discharged up to 2.0 V at 0.5 mA. A discharge capacity of 4.2 mAh was recorded, which corresponds to a capacity retentivity of 86%.

COMPARATIVE EXAMPLE 1

A polyaniline was prepared by the same electrolytic polymerization procedure as in Example 1, and then washed with water containing 0.5 mol/liter of sodium hydroxide instead of deionized water in the same manner as in Example 1.

Using the same as in method Example 1, the content of $BF_4$ in the polyaniline after washing was measured to be 14% by weight.

A coin-type secondary cell of the same structure as in Example 1 was constructed using the polyaniline of this example. A performance test on the cell showed a discharge capacity of 2.7 mAh and a capacity retentivity of 76% after being kept at 60° C. for one week.

COMPARATIVE EXAMPLE 2

A polyaniline was prepared by the same electrolytic polymerization procedure as in Example 1, and then washed with water containing 1 mol/liter of HBF$_4$ instead of deionized water in the same manner as in Example 1.

Using the same method as in Example 1, the content of BF$_4$ in the polyaniline after washing was measured to be 33% by weight.

A coin-type secondary cell of the same structure as in Example 1 was constructed using the polyaniline of this example. A performance test on the cell showed a discharge capacity of 3.0 mAh and a capacity retentivity of 72% after being kept at 60° C. for one week.

COMPARATIVE EXAMPLE 3

A polyaniline was prepared by the same electrolytic polymerization procedure as in Example 1, and then immersed in 12 ml/cm$^2$ polyaniline film of deionized water for 10 minutes, followed by vacuum drying for 72 hours.

Using the same method as in Example 1, the content of BF$_4$ in the polyaniline after washing was measured to be 38% by weight.

A coin-type secondary cell of the same structure as in Example 1 was constructed using the polyaniline of this example. A performance test on the cell showed a discharge capacity of 2.9 mAh and a capacity retentivity of 62% after being kept at 60° C. for one week.

EXAMPLE 2

A working electrode of stainless steel mesh was horizontally disposed in an aqueous acidic solution containing 1.2 mol/liter of aniline and 2.4 mol/liter of HBF$_4$. The counter electrode used was stainless steel of punched metal form. With the solution kept at a temperature of 1° to 5° C., a polyaniline was electrodeposited on the working electrode by applying electricity across the electrodes in a quantity of 50C/cm$^2$ to carry out electrolytic polymerization.

The resulting polyaniline film was taken out together with the stainless steel mesh. The film was 1.1 mm thick and weight 30 mg/cm$^2$. The polyaniline film was washed by passing deionized water at 12° C. through the film at a rate of 200 ml per gram of the film under a reduced pressure of 400 mmHg for 5 to 6 minutes.

The polyaniline film was dried in vacuum at 70° C. for 96 hours. A portion weighing 100 mg was cut out of the film and immersed in 20 ml of deionized water at 25° C. for 48 hours. After it was confirmed that the pH of the water reached equilibrium, the equilibrium pH was measured to be 2.80 at 25° C.

The polyaniline film was dried in vacuum for 75 hours. A portion weighing 50 mg was cut out of the film and then determined for boron fluoride content by the same method as used in Example 1. The amount of BF$_4$ contained in the polyaniline film was calculated to be 27% by weight.

A coin-type secondary cell was constructed by cutting a disk of 15 mm in diameter from the polyaniline film along with the stainless steel mesh, which was used as a positive electrode. The negative electrode used was a lithium-aluminum alloy containing 50 atom% of lithium. The electrolyte solution was a mixture of propylene carbonate and dimethoxyethane in a volume ratio of 40:60 containing 2.2 mol/liter of LiBF$_4$.

The cell was charged up to 3.3 V with a constant current of 1 mA and further charged for 1 hour at a constant voltage of 3.3 V. Immediately after charging, the cell was discharged up to 2.0 V at 1 mA to find a discharge capacity of 4.3 mAh.

A similarly charged cell was kept for 20 days at 60° C. and then discharged up to 2.0 V at 1 mA. A discharge capacity of 3.6 mAh was measured, which corresponded to a capacity retentivity of 84%.

EXAMPLE 3

Electrolytic polymerization of aniline was carried out by first preparing an electrolytic polymerization solution. One mol/liter of aniline was added to an aqueous solution containing 2 mol/liter of HBF$_4$, followed by thorough stirring. A SUS 316 stainless steel mesh of 50 cm × 10 cm was used as a polymerization electrode. The counter electrode used was a punched metal from SUS 316 stainless steel of 50 cm × 10 cm. The counter and polymerization electrodes were horizontally disposed in the solution such that the counter electrode was spaced 5 cm above the polymerization electrode. The solution was kept at 5° C. A polyaniline was deposited on the electrode by carrying out electrolysis with a constant current at a current density of 6 mA/cm$^2$ to an accumulated electricity quantity of 60 C/cm$^2$.

At the end of polymerization, the polyaniline deposit was taken out of the polymerization bath along with the polymerization substrate of SUS 316. The film was pre-washed by sparging deionized water and then washed in the apparatus shown in FIG. 5. The wash liquid used was deionized water and a vacuum of 40 cmHg was applied.

Washing was stopped when the total volume of wash liquid passed reached 10 liters. Washing took about 8 minutes.

The washed polyaniline film was dried in vacuum for 72 hours before it was determined to have a BF$_4$ content of 21% by weight by the same method as used in Example 1.

A coin-type secondary cell was constructed by cutting a disk of 15 mm in diameter from the fully dry polyaniline film along with the stainless steel mesh, which was used as a positive electrode. The negative electrode used was a lithium-aluminum alloy.

The cell was charged up to 3.3 V with a constant current of 0.5 mA and then discharged up to 2.0 V. The cell showed a capacity of 4.7 mAh. The cell could be charged and discharged more than 400 cycles until the capacity fell to 75% of the initial.

EXAMPLE 4

Electrolytic polymerization of aniline was carried out in the bath shown in FIG. 1. The polymerization electrode was a #300 stainless steel of 60 cm × 10 cm. The counter electrode was made up from 10 segments each having a size of 5 cm × 10 cm and formed with a number of perforations of 5 mm in diameter. As shown in FIG. 1, the electrodes are horizontally extended and the polymerization electrode was spaced a predetermined distance of 10 mm below the counter electrode. The electrolytic solution was an aqueous solution containing 1 mol/liter of aniline and 2 mol/liter of HBF$_4$. Electrolytic polymerization was carried out at 5° C. by applying a constant current of 0.6 A to each of the counter electrode segments. Polyaniline was deposited on the surface of the polymerization electrode as a sheet.

Figure 7:
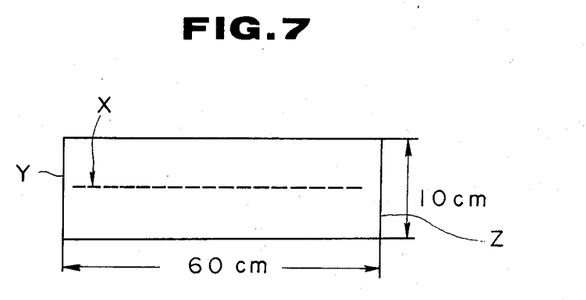
FIG. 7 is a plane view of the polyaniline film prepared in Example 5, showing where the film thickness is measured.
Figure 8:
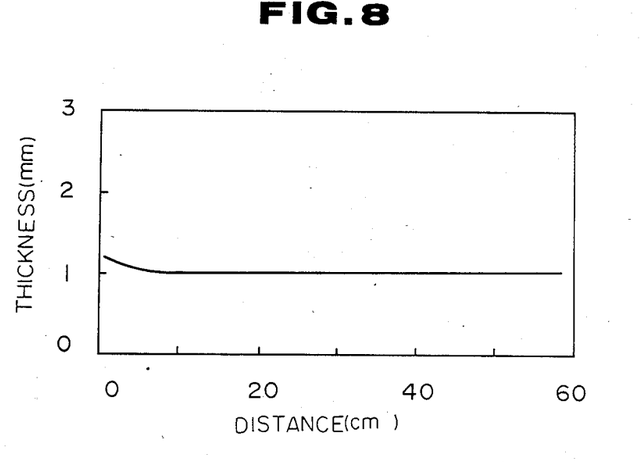
FIG. 8 is a graph showing the thickness of the polyaniline film prepared in Example 5.

The sheet-shaped polyaniline film was taken out of the bath along with the stainless steel mesh and washed by passing deionized water at 10° C. through the film at a rate of 16 ml/cm$^2$. The thickness of the polyaniline film was measured along a longitudinal center line X in FIG. 7 which is a plane view of the film. Opposed edges of the film designated at Y and Z in FIG. 7 correspond to positions designated at Y and Z in FIG. 1. The measured thickness is plotted in FIG. 8 wherein the ordinate is a film thickness in mm and the abscissa is a distance in cm from position Y. The film had a smooth texture everywhere, indicating excellent film formability.

The washed polyaniline film was dried in vacuum for 72 hours before it was determined to have a $BF_4$ content of 24% by weight by the same method as used in Example 1.

A coin-type secondary cell was constructed by punching a disk of 15 mm in diameter from the fully dry polyaniline film along with the stainless steel mesh, which was used as a positive electrode. The negative electrode used was a lithium-aluminum alloy containing 50 atom% of lithium. The electrolytic solution contained 2.5 mol/liter of $LiBF_4$ in a mixture of propylene carbonate and dimethoxyethane in a volume ratio of 50:50. A laminate of a non-woven polypropylene fabric and a porous polypropylene film was used as a separator between the electrodes.

The cell was charged up to 3.3 V with a constant current of 0.5 mA and further charged for 3 hours at a constant voltage of 3.3 V. Immediately after charging, the cell was discharged up to 2.0 V at a constant current of 0.5 mA. The cell showed a discharge capacity of 5.7 mAh.

A similarly charged cell was kept for one week at 60° C. and then discharged up to 2.0 V at 0.5 mA. A discharge capacity of 4.8 mAh was measured, which corresponded to a capacity retentivity of 84%.

EXAMPLE 5

A sheet-shaped polyaniline film was formed by repeating the procedure of Example 4 except that the polymerization bath was replaced by that shown in FIG. 2. More particularly, a length of polymerization electrode 3 was extended around rolls 6 and moved in an arrowed direction at a predetermined speed of 30 cm/hour. The remaining conditions including the use of segmented counter electrode were the same as in Example 4. The film had a smooth texture everywhere, indicating excellent film formability.

The polyaniline film was taken out of the bath along with the stainless steel mesh and washed by passing deionized water at 7° C. through the film at a rate of 18 ml/cm².

The washed polyaniline film was dried vacuum for 72 hours before it was determined to have a $BF_4$ content of 21% by weight by the same method as used in Example 1.

A coin-type secondary cell was constructed by punching a disk of 15 mm in diameter from the polyaniline film along with the stainless steel mesh, which was used as a positive electrode. The negative electrode used was a lithium-aluminum alloy containing 50 atom% of lithium. The electrolytic solution contained 2.5 mol/liter of $LiBF_4$ in a mixture of propylene carbonate and dimethoxyethane in a volume ratio of 50:50. A laminate of a non-woven polypropylene fabric and a porous polypropylene film was used as a separator between the electrodes.

The cell was charged up to 3.3 V with a constant current of 0.5 mA and further charged for 3 hours at a constant voltage of 3.3 V. Immediately after charging, the cell was discharged up to 2.0 V at a constant current of 0.5 mA. The cell showed a discharge capacity of 5.2 mAh.

A similarly charged cell was kept for one week at 60° C. and then discharged up to 2.0 V at 0.5 mA. A discharge capacity of 4.5 mAh was measured, which corresponded to a capacity retentivity of 87%.

EXAMPLE 6

Figure 9:
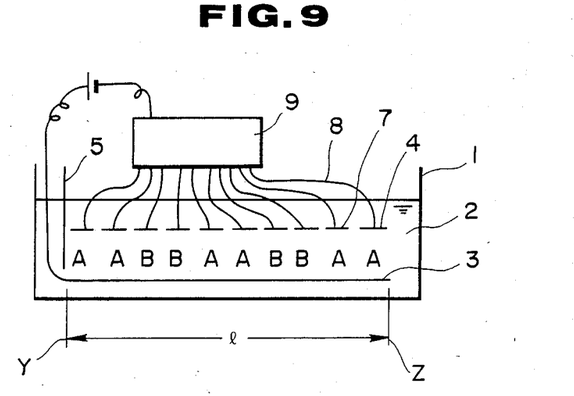
FIG. 9 is a schematic view of polymerization apparatus similar to FIG. 1, showing how the current distribution to counter electrode segments is changed in Example 6.
Figure 10:
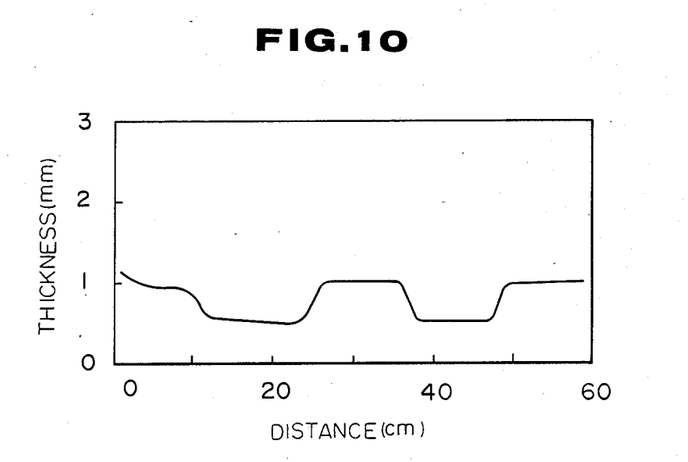
FIG. 10 is a graph showing the thickness of the polyaniline film prepared in Example 6 with the current distribution shown in FIG. 9.

A sheet-shaped polyaniline film was formed by repeating the procedure of Example 4 except that the electricity distribution to counter electrode segments was changed. More particularly, the counter electrode segments were grouped into A and B as shown in FIG. 9. A constant current of 0.6 A was applied to each of segments A and a constant current of 0.3 A was applied to each of segments B. The remaining conditions were the same as in Example 4. The thickness of the polyaniline film was measured in the same manner as in Example 4, with the results shown in FIG. 10.

A piece of 5 cm long was cut from the central portion of the sheet-shaped polyaniline film having a thickness of about 1.2 mm which corresponded to the two central counter electrode segments A, A in FIG. 9. The piece was washed by passing deionized water at 5° C. at a rate of 15 ml/cm².

The washed polyaniline film was dried in vacuum for 72 hours before it was determined to have a $BF_4$ content of 26% by weight by the same method as used in Example 1.

A coin-type secondary cell was constructed by punching a disk of 15 mm in diameter from the polyaniline piece along with the stainless steel mesh, which was used as a positive electrode. The negative electrode used was a lithium-aluminum alloy containing 50 atom% of lithium. The electrolytic solution contained 2.5 mol/liter of $LiBF_4$ is a mixture of propylene carbonate and dimethoxyethane in a volume ratio of 50:50. A laminate of a non-woven polypropylene fabric and a porous polypropylene film was used as a separator between the electrodes.

The cell was charged up to 3.3 V with a constant current of 0.5 mA and further charged for 3 hours at a constant voltage of 3.3 V. Immediately after charging, the cell was discharged up to 2.0 V at a constant current of 0.5 mA. The cell showed a discharge capacity of 4.8 mAh.

A similarly charged cell was kept for one week at 60° C. and then discharged up to 2.0 V at 0.5 mA. A discharge capacity of 4.2 mAh was measured, which corresponded to a capacity retentivity of 88%.

Obviously, numerous modifications and variations of the present invention are possible in light of the above teachings. It is therefore to be understood that within the scope of the appended claims, the invention may be practiced otherwise than as specifically described herein.

We claim:

1. A non-aqueous secondary cell comprising a positive electrode, a negative electrode and an non-aqueous electrolyte solution, wherein the positive electrode comprises as an active material polyaniline film which has been purified by continuously passing 2 to 20 ml/cm² of water per 1 mm thickness of the polyaniline film through the film in a thickness direction thereof at a flow rate of 0.1 to 10 ml/cm² min to remove impurities.

2. The cell of claim 1 wherein the polyaniline film is deposited on a planar network electroconductive material.

3. The cell of claim 2 wherein the planar network electroconductive material is a stainless steel mesh.

4. The cell of claim 1 wherein said polyaniline is prepared by
   immersing a polymerization electrode and a counter electrode comprising a plurality of spaced-apart segments in an electrolytic polymerization solution in an electrolysis tank, and
   conducting electricity across the electrodes to carry out electrolytic polymerization to deposit a polyaniline film on the polymerization electrode while independently controlling the current or voltage applied to the plurality of counter electrode segments.

5. The cell of claim 4 wherein a shield partition is disposed between two adjoining ones of the counter electrode segments.

6. The cell of claim 1 wherein the negative electrode comprises as an active material a lithium-aluminum alloy containing 25 to 65 atom% of lithium.

7. The cell of claim 1 wherein said electrolyte solution comprises a mixture of 35 to 65% by volume of propylene carbonate and the balance of dimethoxyethane having dissolved therein from more than 1 mol/liter to 3 mol/liter of $LiBF_4$.

8. The cell of claim 1, wherein said polyaniline film has been purified by passing water through the film under super- or sub-atmospheric pressure.

9. The cell of claim 1, wherein the polyaniline film is washed with water such that when 1 gram of polyaniline is extracted with 200 ml of water, the extract water has an equilibrium pH in the range of from 2.4 to 4.

10. The cell of claim 1, wherein the polyaniline film which has been washed with water contains 15% to 30% by weight of $BF_4$.

* * * * *